May 28, 1957 · E. FOSDICK · 2,793,393
FOWL DEHEADING MACHINE
Filed Oct. 7, 1954 · 3 Sheets-Sheet 1

Earnest Fosdick
INVENTOR.

BY

May 28, 1957    E. FOSDICK    2,793,393
FOWL DEHEADING MACHINE
Filed Oct. 7, 1954    3 Sheets-Sheet 2

Earnest Fosdick
INVENTOR.

May 28, 1957
E. FOSDICK
2,793,393
FOWL DEHEADING MACHINE
Filed Oct. 7, 1954
3 Sheets-Sheet 3
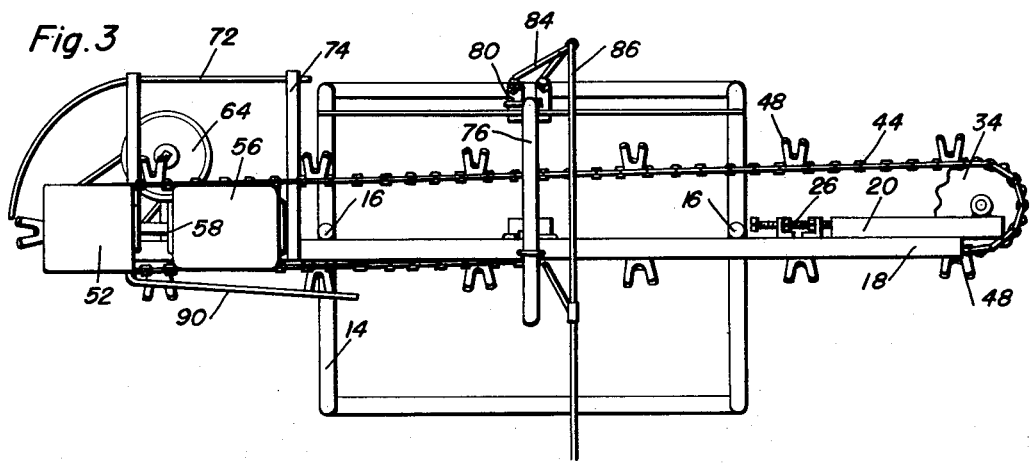
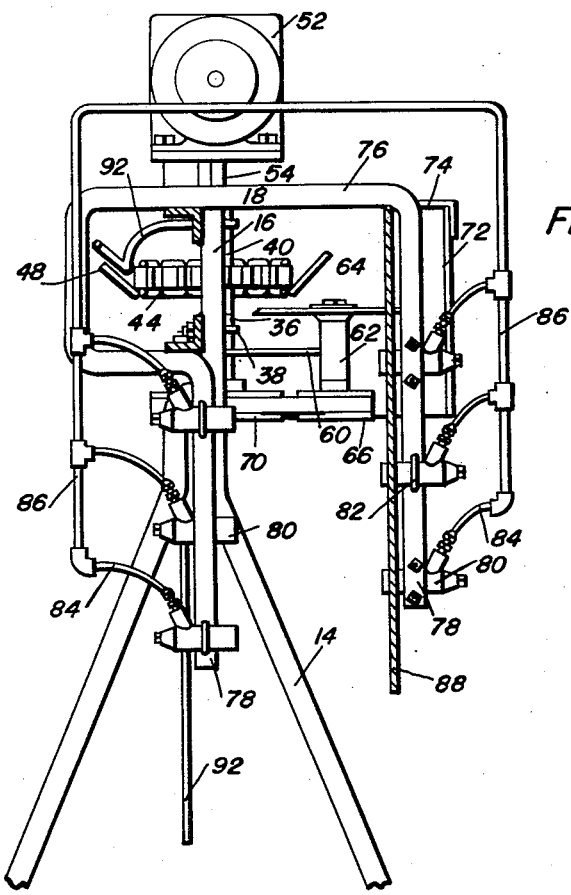
Earnest Fosdick
INVENTOR.

United States Patent Office 2,793,393
Patented May 28, 1957

2,793,393

FOWL DEHEADING MACHINE

Earnest Fosdick, Fairbury, Ill.

Application October 7, 1954, Serial No. 460,922

2 Claims. (Cl. 17—12)

This invention relates to a fowl singeing and deheading machine for use in poultry processing for expediting the deheading and singeing operation as well as the entire fowl processing operation.

An object of this invention is to provide a fowl singeing and deheading machine including an endless conveyor chain having means for supporting the fowls thereon wherein the fowls will be first passed between fire nozzles for singeing and then passed over a circular saw for severing the heads from the body portion wherein the body portion will be automatically deposited into a chill tank and the severed head will be pushed from the conveyor chain into a suitable receptacle.

Another object of this invention is to provide a fowl deheading and singeing machine that is relatively simple in construction, easy and efficient in use, well adapted for use in a continuous fowl processing operation, safe, and relatively inexpensive to manufacture.

Another important object of the present invention is the provision of a fowl singeing and deheading device for relatively small processing operations for poultry for use in the dressing of the poultry. At the beginning, the live bird is hung by the feet and held therein by securing bars. In this section of the operation, the actual slaughtering and bleeding of the poultry takes place. From this stage, the slaughtered bird or fowl proceeds to a suitable scalding and defeathering machine. After the bird has been completely defeathered, it is hung on the endless conveyor chain and then is passed through the singeing and deheading device with which the above invention is related. Accordingly, the provision of an integral part of a complete fowl processing operation is an important feature of the present invention.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a top plan view of the fowl processing machine of the present invention;

Figure 1:
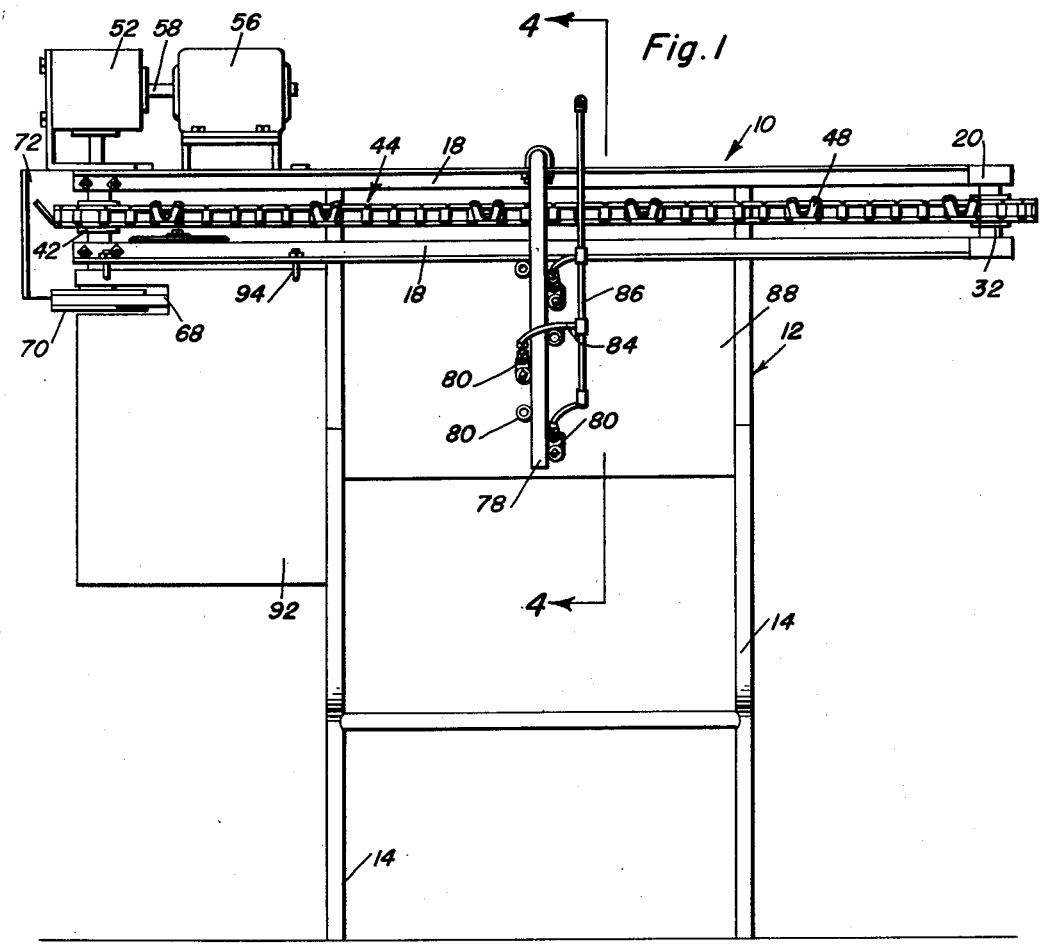
Figure 1 is a side elevational view of the fowl singeing and deheading machine of the present invention.
Figure 5:
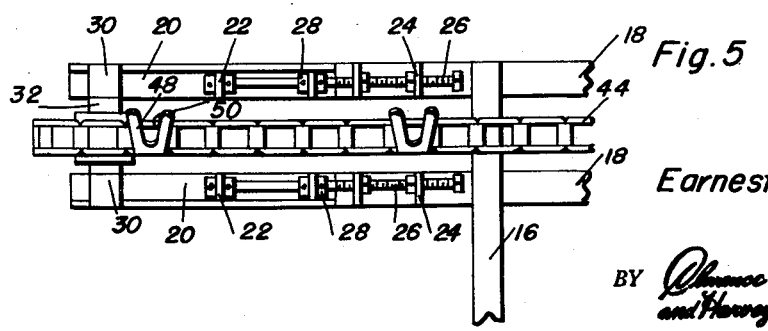
Figure 2:
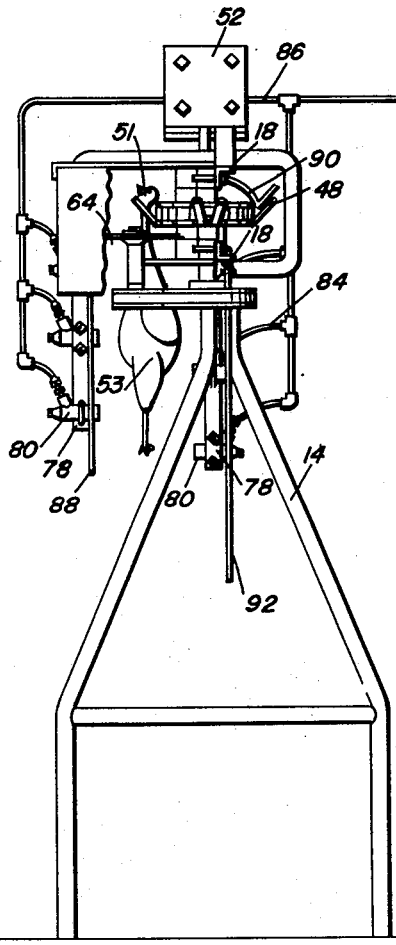
Figure 2 is an end elevational view showing the saw end of the machine with the saw guard partially broken away.
Figure 6:
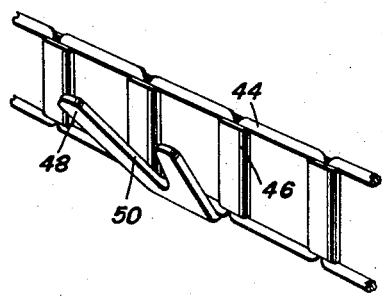

Figure 4 is an enlarged vertical, sectional view taken substantially upon a plane passing along section line 4—4 of Figure 1 showing the details of construction of the fire nozzles, the rotatable saw and the baffle for limiting passage of the fire discharged from the nozzles; and Figure 5 is an enlarged side elevational view showing the adjusting means for adjusting the sprocket for adjusting the tension of the conveyor chain; and Figure 6 is a detailed perspective view showing the construction of the conveyor chain of the present invention and showing the outwardly and upwardly diverging fingers in the nature of a V-hook for engaging and supporting the fowl's head.

Referring now specifically to the drawings, it will be seen that the numeral 10 generally designates the fowl singeing and deheading machine of the present invention which includes a supporting frame generally designated by the numeral 12. The frame 12 includes two pairs of spaced downwardly diverging leg members 14 that are secured together at their upper ends into a longitudinally elongated angle iron members 18 secured thereto as by welding or any other suitable fastening means. At one end of the angle iron members 18 is positioned a pair of extension angle iron members 20 having lugs 22 thereon. Threadably received in lugs 24 on the angle iron members 18 is a threaded bolt 26 wherein the bolt 26 moves when rotated in relation to the angle iron members 18. Inasmuch as the bolt 26 is integral throughout its length and is rotatably positioned in the lugs 22 by flanges 28 positioned on each side of the lugs 22 the extension 20 will be moved longitudinally in relation to the angle iron members 18. A pair of bearing members 30 are positioned in vertical alignment on the extension 20 for rotatably receiving the axle 32 of a sprocket gear 34 which is disposed in a horizontal plane and rotates about a vertical axis.

At the other end of the angle iron members 18 is a vertically disposed bearing 36 on each of the angle iron members 18 and secured thereto by a U-bolt 38 wherein the axle 40 of a sprocket gear 42 is journaled therein for rotation about a vertical axis and in the same horizontal plane as the sprocket gear 34 for receiving an endless sprocket chain 44 in encircling relation. As illustrated in Figure 6, the chain 44 is made up of a plurality of links joined together by connecting members 46 and certain of the links are provided with upwardly and outwardly diverging fingers 48 secured to the lower end of the links of the chain 44. These fingers 48 form substantially a V-shaped notch indicated by the numeral 50 for receiving the head 51 of a fowl 53 such as a chicken or the like.

Positioned vertically above the sprocket gear 42 is a gear box 52 having a drive shaft 54 extending downwardly and forming an extension to the axle 40 of the gear 42 for driving the gear 42 and the sprocket chain 44. A suitable electric motor 56 is provided for supplying power to the gear box through a drive shaft 58 wherein the gear box 52 will reduce the rotational speed to the desired amount.

Secured to the lower of the angle iron members 18 and projecting laterally therefrom is a bracket 60 terminating in a vertical bearing 62 for journaling the axle of a circular saw 64. The lower end of the axle is provided with a V-belt pulley 66 for engagement by a V-belt 68 that also encircles a V-belt pulley 70 on the lower end of the drive shaft 54 which is an extension of the axle 40 of the sprocket gear 42 thereby rotating the circular saw about a vertical axis and in a horizontal plane below the plane of movement of the sprocket chain and the fingers 48 secured thereto so that the head 51 will be severed from the fowl 53. A generally arcuate guard 72 is positioned around the circular saw 64 and supported by suitable brackets 74 for protecting persons from accidental engagement with the saw 64 thereby preventing cutting of persons engaged about the machine of the present invention.

Positioned centrally over the upper of the angle iron members 18 is a generally inverted U-shaped member 76 which has leg portions depending below the sprocket chain 44 and including a leg portion on each side of the path of movement of the fowls 53. On each of the legs 78 of the U-shaped member 56 is a plurality of torch nozzles 80 that are secured thereto by U-shaped bolts 82. It will be noted that three torch or fire nozzles 80 are secured to each leg 78 of the U-shaped member 76 and that two of the nozzles are on one side of the legs 78 and the other of the nozzles is on the other side thereof thereby adequately covering the area between the nozzles 80 on each of the legs 78. It will be noted that the nozzles 80 are positioned on opposite sides of the path of movement of the fowls 53 supported from the fingers 48 wherein the fire from the nozzles will adequately and efficiently singe the entire area of the fowl that passes therebetween. Also, the nozzles 80 on one leg 78 of the U-shaped member 76 are disposed in staggered relation to the other row of nozzles 80 wherein the entire area of the path of movement of the fowls 53 will be adequately covered thereby assuring that fowls of all sizes will be efficiently singed. Each of the nozzles 80 is provided with an inlet line 84 connected to a supply tube 86 which is connected to a suitable source of fuel such as gas or the like for supplying fuel to the fire nozzles 80 thereby forming an effective singeing device for the machine of the present invention. A baffle plate 88 is provided in surrounding relation on one vertical row of nozzles 80 so that the flames directed from the other row of nozzles 80 will not pass beyond the baffle 88 wherein persons may position fowls on the sprocket chain 44 without danger of burning from the fire nozzles 80.

After the fowls 53 pass between the nozzles 80, the heads 51 are severed therefrom by the circular saw 64 wherein the body portion of the fowl 53 will drop downwardly and be guided into a suitable chill tank. The head is retained on the fingers forming the V-shaped notch 50 and continues around on the endless chain 44 until a rod 90 comes into contact in overlying relation to the fingers 48 wherein the rod 90 diverges from the path of movement of the fingers 98 wherein the severed head 51 will be pushed off of the fingers 48. A baffle plate 92 is secured to the lower of the angle iron members 18 by U-bolt 94 for engaging and guiding the severed heads into a suitable receptacle away from the chill tank.

In practical operation, the machine of the present invention is so positioned and arranged in order to be adjacent the discharge from the defeathering device. Of course, the machine of this present invention may be utilized in conjunction with a continuous flow fowl process wherein the conveying chain 44 may actually be a part of a continuous conveying chain utilized in the continuous flow process. In any event, the fowls 53 are suspended from the fingers 48 by the heads 51. The conveying chain 44 passes the fowls 53 between the fire nozzles 80 wherein the fowl 53 is completely and efficiently singed. The fowl then passes over the saw 64 wherein the saw will sever the head 51 immediately below the sprocket chain 44. The main body portion of the fowl 53 will then be deposited in a chill tank (not shown). The heads are retained on the fingers 48 until such time as the rod or bar 92 urges the heads outwardly therefrom. The machine of the present invention may be used in processing various types of fowl or poultry such as chickens, ducks, turkeys, or the like wherein it is necessary to singe the bodies of the fowls after they have been defeathered. Also, it will be noted that the component elements of the present invention permit the machine of the present invention to be constructed of inexpensive materials lending itself to inexpensive manufacture and yet retaining efficiency of operation.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is new is as follows:

1. In a fowl dressing apparatus, the combination of a supporting frame, an endless conveyor which includes an endless conveyor member having rotating members at opposite ends thereof and adapted to rotate about vertical axes, said rotating members being carried by said supporting frame, a plurality of pairs of generally V-shaped fingers protruding laterally outwardly and upwardly from the outer sides of said endless member and in which to support fowls by the head while the conveyor propels them in a horizontal plane, a rotating cutter, means carried by said frame and driving said endless conveyor and said cutter, said cutter being located slightly below said pairs of fingers and to one side of a longitudinal center line of the conveyor, a severed head baffle carried by said frame and adjacent to said rotating cutter, a severed head ejector consisting of a rod attached at one end to said frame and having a part which extends diagonally across the path of travel of said pairs of fingers as the endless conveyor is actuated in order to push the severed fowl heads from said pairs of fingers.

2. The fowl dressing apparatus of claim 1 wherein said endless member comprises a chain, said endless conveyor rotating members consisting of a pair of sprockets with which said chain is enmeshed, said frame having a horizontal upper part, a pair of spindles on which said sprockets are mounted for rotation and carried by said horizontal upper part of said frame near the opposite ends thereof, said means for actuating said conveyor and said cutter being carried by said horizontal part of said frame.

References Cited in the file of this patent

UNITED STATES PATENTS

| | | |
|---|---|---|
| 1,760,392 | Arminger | May 27, 1930 |
| 1,890,394 | Long | Dec. 6, 1932 |
| 1,975,196 | DeVout | Oct. 2, 1934 |
| 2,129,968 | Sargent et al. | Sept. 13, 1938 |
| 2,210,377 | Onorato et al. | Aug. 6, 1940 |
| 2,602,185 | Johnson | July 8, 1952 |